Patented Aug. 25, 1931

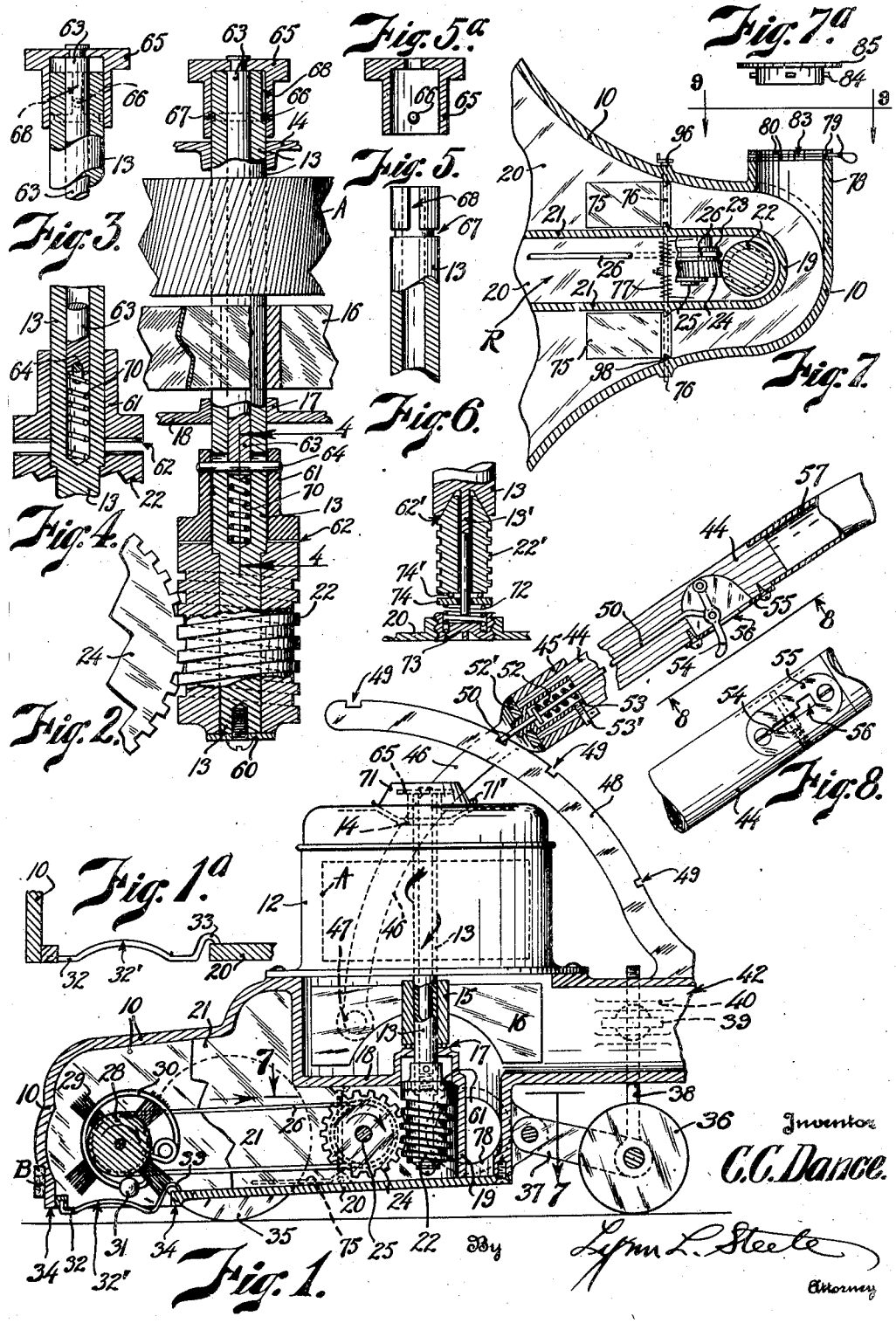
Aug. 25, 1931.  C. C. DANCE  1,820,350
VACUUM CLEANER
Filed March 24, 1923  2 Sheets-Sheet 1

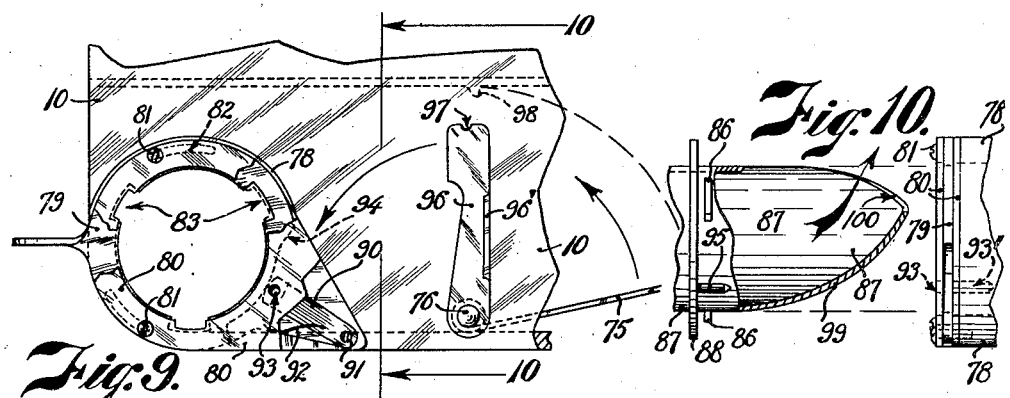

1,820,350

UNITED STATES PATENT OFFICE

CLIFFORD C. DANCE, OF DENVER, COLORADO, ASSIGNOR TO DANCE SUCTION SWEEPER COMPANY, OF DENVER, COLORADO, A CORPORATION OF DELAWARE

VACUUM CLEANER

Application filed March 24, 1923. Serial No. 627,294.

The object of this invention is to provide a novel and highly efficient vacuum cleaner, and more especially one wherein brushing and beating are positively combined with the suction effects.

Briefly, the invention comprises a casing having preferably a single, elongated intake opening, a motor on the casing, a suction-creating fan driven by the motor, and means also driven by said motor for positively brushing or beating or both brushing and beating a floor covering, the driven means being rotated. If desired one of the means may be other than rotatably mounted. There is preferably provided some form of clutch between the motor and said driven means whereby the latter may be disengaged from driving relation with the motor. The invention also includes novel means for cutting off the air current through said intake opening, said means preferably being in the form of swinging gates within the casing. A connection for an attachment to be used when said intake is cut off, is provided, and in the preferred form such connection includes means for prevention of mounting of the attachment except when the gates are in closed position. Novel means for adjusting the handle of the machine and for connecting the free end of the dust bag with said handle are also employed.

Subject matter disclosed in the present application is also disclosed in my companion application Serial No. 627,293 filed March 24, 1923, which matured into Patent No. 1,773,961, August 26, 1930.

In the accompanying drawings wherein certain embodiments of the invention are disclosed by way of illustration, and wherein certain features claimed in said companion application are also disclosed, Fig. 1 is chiefly a central vertical section through a cleaner of this invention, the motor housing being in elevation;

Fig. 1a shows a varied positioning of the guard fingers;

Fig. 2 is a sectional detail of the driving mechanism;

Fig. 3 shows the adjusting cap of Fig. 2 in elevated position; and Fig. 4 shows a clutch part in correspondingly elevated position;

Fig. 5 shows the upper end of the motor shaft in elevation, and Fig. 5a is a section through the cap normally carried on said upper end of the shaft;

Fig. 6 is a vertical section through a modified form of clutch and control therefor;

Fig. 7 is a fragmentary horizontal section through the cleaner taken on line 7—7 of Fig. 1, Fig. 7a showing a closure to fit the opposed neck 78 of Fig. 7;

Fig. 8 is a handle detail taken from line 8—8 of Fig. 1;

Fig. 9 is an elevational detail taken from line 9—9 of Fig. 7;

Fig. 10 is an elevation taken from line 10—10 of Fig. 9 showing the end of an attachment to be used;

Fig. 11 is a side elevation of the cleaner;

Fig. 11a shows a form of connection of the bag to the handle;

Figs. 12 to 17 show various modified arrangements of brush and beater mechanism, rotary beaters and non-rotary brushes being shown in Figs. 12 to 15, and rotary brushes with non-rotary beaters being shown in Figs. 16 and 17.

The cleaner includes a main casing 10 upon which there is mounted a motor housing 12 in which there rotates an armature A carried on a motor shaft 13 hollow through a portion of its length and mounted in two bearings only, one of which bearings is provided at 14 in the upper part of the motor housing 12. Below the armature A and the motor housing 12, the shaft 13 carries the hub 15 of a suction-creating fan 16 working above an inner narrow horizontal wall 18 which carries the second bearing 17 for the shaft 13. The wall 18 in conjunction with an inner vertical wall 19 at the rear, a bottom 20 and parallel inner walls 21 extending forward from wall 19, form a dust-tight chamber such as described in said companion application. Into said dust-tight chamber the shaft 13 depends and carries thereon a worm gear 22 driven through the medium of a clutch 61, 62 to be described, and meshing with a gear wheel 24 carried on a shaft 25 for the purpose of actuating brushes and beaters. The gear wheel 24 carries a pulley 23 driving a belt 26 passing over and driving a brush head 28 suitably journaled at the ends of the casing. This brush head 28 carries bristles 29 and a plurality of spring beater fingers 30 having knobs 31 at their ends, so that rotation of the brush head throws said knobs outward by centrifugal force and causes them to beat the floor covering drawn up against the guard fingers 32 at the intake opening. These guard fingers are suitably secured at the forward edge of the intake opening and span the opening to limit the upward movement of the carpet. The fingers 32 are provided in such number as to serve the purpose desired. If preferred the middle portions 32' of the fingers may be curved upward so as to produce a corresponding curvature in the floor covering and better open up the nap for action thereupon by the brushes. Also the rear ends of the fingers will be looped upwardly and thence downward to engage the upper face of the bottom 20 as described in said companion application and provide a space for the upward movement of matches and the like, as at 33.

Preferably portions of the guard fingers 32 are spaced below the plane of the intake opening for the purpose of holding the floor covering away from the edges or lips 34 of said opening when the covering is drawn up by influence of the suction produced by fan 16. This permits a current of air to pass between said lips and the floor covering for the purpose of carrying away dust loosened by the brush and beaters. However the amount of air so taken into the casing 10 is much less than the capacity of the fan 16, with the result that air is also drawn through the floor covering to the under side thereof at points beyond said intake opening and is then drawn upward through the floor covering at the intake opening. Thus an air cushion is provided between the covering and the floor upon which the beating and sweeping action is performed. This arrangement is shown in Fig. 1. However, the guard fingers 32 may be placed within the plane of the opening so that passage of air currents between the lips 34 of the intake opening and the floor covering will be retarded, as indicated in Fig. 1a. The positioning of said lips 34 with relation to the floor covering is controlled by floor wheels 35 carried on the casing at the rear of the intake opening and rear wheels 36 adjustably carried on arms 37 pivoted to the rear of the casing, the adjustment being obtained through screws 38 connected with the wheels 36 and carrying adjusting nuts 39 held between lugs 40 on the casing.

The dust which is loosened as above described and picked up by the air currents, is carried rearward along the sides of the walls 21 of the dust-tight housing and is discharged from the fan 16 through the passage 42 at the rear of the casing into the usual dust bag. The curved portions 32' of the guard fingers 32 cause the nap to be opened up for better action of the brushes 29. Matches and the like caught between one or more guard fingers and the carpet will be released to the air currents when they come below the looped portions 33.

The cleaner is moved over the floor by means of a hollow handle 44 received in a socket 45 of a yoke 46 pivoted at 47 to the casing 10. The position of the handle may be maintained by means of a curved support or arc 48 having a plurality of notches 49 therein to receive the end of a rod 50 slidably mounted in said hollow handle 44 and normally urged into notch-engaging position by means of a spring 52 carried in a housing 53 in the end of the handle. The rod 50 is controlled by means of a latch 54 pivoted in the handle and projecting through a bayonet slot 56 in a plate 55 on the handle. By setting the latch 54 in the upper portion of slot 56 the rod will be held in disengaged position against tension of spring 52.

The upper portion 57 of said handle may be tubular as shown and may include a grip. As shown in Fig. 11a, this portion may also support a dust bag 106 through the medium of a slot 107 in the handle which receives a hook 108 retained in the slot by a ball 109. The ball is received through an enlargement 110 of the slot at the upper end thereof, over which a hollow cap 111 is secured by means of a thumb screw or the like 112, said cap being also adapted to receive said ball when the bag is extended and the handle is in a lower position. Fig. 11 shows a modified form of handle support comprising a brace or link 101 having upper and lower short notches 102 and a middle elongated notch 103, said notches being adapted to engage a pin 104 on the casing. The lower end of brace 101 may be drawn back by the operator's toe and the handle raised or lowered for engagement of any notch with said pin 104. Elongated notch 103 permits natural movements of the handle during use. A guard clip 105 limits the rearward movement of the brace during adjustment.

As seen in Fig. 1, the handle is secured in the socket 45 by means of a nut 52' threaded on an extension of housing 53, and by means of a screw 53' passed through the parts as shown and slidable in a notch extending inward from the end of socket 45.

In order that the machine may be used with an attachment, the gear 22 is adapted to be disconnected from driving relation with the shaft 13 to render the brush 29 and the beaters 30 inoperative. For that reason the gear 22 is loosely mounted upon shaft 13 and is held thereon in rotatable relation therewith by means of a screw and washer 60 or the like. Above the gear 22 a clutch member 61 is non-rotatably but slidably mounted on shaft 13 and both the clutch 61 and gear 22 are provided with cooperating clutch teeth 62. The upper portion of shaft 13 is hollow and receives therein a stem 63 whose lower end is bifurcated and engages over a pin 64 passing through the shaft 13 and being carried by the clutch 61 for driving the latter. A spring 70 engages the lower end of stem 63 to urge the same along with pin 64 upward for holding clutch 61 in disengaged position. A cap or knob 65 secured to the upper end of stem 63 is provided with a stud 66 adapted to travel in an annular groove 67 and a vertical groove 68 connecting therewith in the shaft 13. When stud 66 is in groove 68 the spring 70 releases the clutch 61 by forcing the same and stem 63 upward. By pressing the cap 65 and stem 63 downward against spring 70 and then turning stud 66 into annular groove 67 the clutch 61 is held in engagement with gear 22 for driving the same. Cover 71 hinged at 71' encloses cap 65.

A modified form of means for driving and releasing the brush and beater mechanism is shown in Fig. 6 where the gear 22' is provided for gear 22, gear 22' being journaled on a reduced extension 13' of shaft 13 and a friction or cone clutch 62' being provided between the shaft and the gear. A spring 72 carried by a cap 73 threaded into the bottom 20 of the cleaner, presses against a washer 74 and ball bearings 74' and urges the gear into driving engagement with the shaft. Partial outward rotation of the threaded cap 73 disengages clutch 62' by releasing the spring; or the spring may be removed and the cap replaced; or the cap, spring and gear 22' may all be removed.

After releasing the brush and beater-driving mechanism, intake of air through the intake opening is cut off by swinging up a pair of gates 75 disposed between the walls of the casing 10 and the walls 21 of the dust-tight chamber, these gates being actuated by a shaft 76 on which they are secured. Normally the gates 75 are held in open position against the bottom 20 of the casing 10 as seen in Figs. 1 and 7, a spring 77 in the dust-tight chamber acting upon shaft 76 to maintain the position. A lever 96 on the outer end of shaft 76 provides means for swinging the gates into closed position against stops 98 on the inner walls of the casing.

A neck 78 is provided for connection of an attachment 87 (Fig. 10) after the gates 75 have been closed. This neck carries a middle partly rotatable ring 79 disposed between two stationary rings 80 secured to the end of the neck, and all rings are notched at 83 for the purpose of admitting to the innermost notches tongues 84 provided on a closure 85 (Fig. 7a) and tongues 86 provided on attachment 87. The rings are retained by screws 81 while slots 82 in ring 79 permit limited rotation thereof. Thus after tongues 84 or 86 have passed into the notches 83 of the innermost ring, rotation of ring 79 locks them in such position. However means is provided to prevent the mounting of attachment 87 until the gates 75 have been closed, no such means being required for the closure 85 which is in position to close the neck 78 when the machine is employed for floor cleaning. Such means comprises a latch or intercepter 90 pivoted at 91 and controlled by a spring 92, the moving end of the latch being normally disposed behind an aperture 93 in ring 80 which is outermost and in front of an alined socket 93' in neck 78. Aperature 93 and socket 93' are adapted to receive a pin 95 carried on a flange 88 of the attachment 87, when the intercepting latch 90 is displaced. Displacement of said intercepter 90 is produced by engagement thereof by the lever 96 when closing gates 75.

Thus when finger piece 96' on lever 96 is depressed and lever 96 is moved to close gates 75, the latch 90 is moved by said lever away from aperture 93 and a notch 97 on the end of lever 96 is brought into alinement therewith. This permits passage of the pin 95 on attachment 87 into the socket 93', and at the same time said pin 95 through engagement in notch 97 retains lever 96 and gates 75 in closed position, the attachment being locked in position by rotation of ring 79 after tongues 86 have passed into the innermost ring 80. Preferably the lower portion of the attachment has an upwardly curved wall 99 while its upper portion is open at 100 so the air currents are positively directed upward toward the fan 16. The outer end of the attachment 87 is adapted for the connection of a suitable hose to which any form of suction nozzle or the like may be attached. The present construction makes it impossible to connect the attachment unless the gates 75 have been closed to cut off intake through the opening adjacent the brush and beaters.

It is obvious, that the brush and beaters may be disconnected from the driving means for floor cleaning purposes if desired as well as for use of an attachment.

In Figs. 12 to 17 other satisfactory arrangements of brush and beater constructions are disclosed. In Fig. 12 the brush is mounted on an arm 115 oscillated by a pin 116 on head 28 working in a slot 117. This Fig. 12 also shows a straight guard finger disposed within the intake opening as seen at 232. In Fig. 13, the brush head 120 is mounted on a stem 121 working in a bracket against a spring 123. In Fig. 14, the brush head 125 reciprocates in a slot 126, a cam 128 on head 28 engaging arms 127 on brush head 125 to produce reciprocation. In Fig. 130

15, the brush head 130 is stationary. In the above forms the beater is rotary. In Figs. 16 and 17, the brush is rotary, the beaters 132 of Fig. 16 being vertically reciprocable in brackets 133 against springs 134, elevation being produced by an arm 136 on brush head 28 which engages a cam 135 on the beaters. In Fig. 17 the beater knobs 140 carried on spring arms 141 are mounted on the oscillating arm 115 of Fig. 12. Thus various forms for brush and beater operation may be had with either rotary brush or rotary beater.

I claim:

1. In a vacuum cleaner, a casing having an intake opening, a motor having a shaft, a fan driven by said shaft, a drive member rotatably mounted on said shaft and adapted to have driving relation therewith, means to provide a driving connection therebetween, cleaning means operatively connected with said member, and separate means also on said shaft for holding said drive member in and out of driving relation with said shaft.

2. In a vacuum cleaner, a casing having an intake opening, a motor having a shaft, a fan driven by the shaft, a drive member on said shaft and having a clutch part, a clutch part slidable on the shaft for driving engagement with the first clutch part, cleaning means adjacent said opening operatively connected with said drive member, means also on said shaft for causing relative movement of the clutch parts for placing the clutch out of driving relation with said member, and cooperating means on said shaft for placing the clutch in driving relation.

3. In a vacuum cleaner, a casing having an intake opening, a motor having a shaft, a fan driven by the shaft, a drive member rotatably mounted on said shaft and having a clutch part, a clutch part slidable on the shaft for driving engagement with said member, cleaning means adjacent said opening operatively connected with said member, means on the shaft for sliding the one clutch part out of driving relation with the first mentioned clutch part, and cooperating means on the shaft for sliding the clutch part into driving relation.

4. In a vacuum cleaner having a casing provided with an intake opening, a motor, a motor shaft, a fan driven by the shaft, a drive member having a clutch part and adapted to be rotated by said shaft and having its axis in line with the axis of the shaft, a clutch part slidable on the shaft to and from engagement with the member for engaging and disengaging the latter, said first clutch part having driving engagement with the second clutch part and having its axis alined with the axis of the shaft, means for actuating said slidable clutch part, and cleaning means actuated by said drive member.

5. In a vacuum cleaner comprising a casing having an intake opening adapted to be moved over a surface to be cleaned, a motor having a shaft, a fan driven by said shaft, a drive member rotatably mounted on said shaft and adapted to have driving relation therewith, clutch means on said member and on said shaft to produce such relation, cleaning means operatively connected with said member, a stem extending from one end of said shaft to said clutch means and movable within the shaft for placing said drive member in and out of driving relation with the shaft.

6. In a vacuum cleaner, a casing having an intake opening, a motor having a shaft, a fan thereon, a gear mounted to rotate on said shaft and having a clutch part, cleaning means adjacent said opening and operatively connected with said gear, a second clutch part slidable on said shaft, a stem movable within said shaft for actuating said second clutch part, and means for holding said stem in adjusted position.

7. In a vacuum cleaner, a casing having an intake opening, a motor, a motor shaft, a fan on said shaft, a clutch part slidable on said shaft, said shaft projecting beyond said clutch part, a drive member movably mounted on said shaft and having a clutch part complementary to the slidable clutch part, cleaning means driven by said drive member, a stem movable within said shaft and connected to said slidable clutch part for placing said clutch parts in and out of driving relation with each other, and separate means for holding said stem in either adjusted position.

8. In a vacuum cleaner, a casing having an intake opening, guard fingers disposed across and throughout the length of said opening having their middle portions curved upward to open up the nap of a carpet drawn up against said fingers, and suction creating means to lift the carpet up to said fingers and remove dust.

9. In a vacuum cleaner, a casing having an intake opening, guard fingers disposed across said opening having middle portions curved upward so that points thereof nearest the middle are above the plane of said intake opening, and portions of the fingers adjacent their ends extending below the plane of the intake opening to prevent sealing of said intake opening by a carpet, and suction creating means to draw a carpet up to said fingers whereby the curved portions will open up the nap.

10. In a vacuum cleaner, a casing having an intake opening, a motor having a shaft, a fan driven by the shaft, a drive member rotatably mounted on the shaft and having a clutch part, a clutch part on the shaft for driving engagement with said member, cleaning means within said opening operatively connected with said drive member, and means partly within said shaft for causing relative movement between said part for placing the drive member in and out of driving relation with said shaft.

11. In a vacuum cleaner, a casing, a motor therein, a motor shaft, a fan and a drive member on said shaft, a second drive member driven by the first member, and cleaning elements operatively connected with the second drive member, the first member being disengageable from driving relation with said shaft, slidable means extending within said shaft to produce such disengagement, said second driving means being adapted to remain in operative relation with the first driving member when disengaging the first member from driving relation with said shaft.

12. In a vacuum cleaner, a casing having a bottom wall with an intake opening therein, guard fingers disposed across said opening having their middle portions curved upward to open up the nap of a carpet drawn up thereagainst, the rear portions of the fingers having upwardly extending looped portions the rear extremities of which are directed downward and engage the upper face of said bottom wall, and suction creating means to draw the carpet up to said fingers and to remove dust.

13. In a vacuum cleaner, a casing having a bottom wall with an intake opening therein, guard fingers disposed across said opening having middle portions curving upward and portions thereof extending below the plane of the opening for holding a carpet spaced somewhat from the lips of the opening, the rear portions of the fingers having upwardly extending looped portions whose rear extremities are directed downward and engage the upper face of said bottom wall, and suction creating means to draw the carpet up to said fingers and to remove dust.

14. In a vacuum cleaner, a casing having a bottom wall provided with an intake opening, guard fingers disposed across said opening having their middle portions curved upward and portions adjacent their ends extending below the lips of the opening to space a carpet from said lips, the rear portions of the fingers having upwardly looped portions whose rear extremities are directed downward to engage the upper face of said bottom wall, and suction creating means in the casing.

15. In a vacuum cleaner, a casing having an intake opening, a motor, a motor shaft, a fan on said shaft, a clutch part on and slidable longitudinally of said shaft, said shaft projecting beyond said clutch part, a drive member rotatably mounted on the projecting part of the shaft and having a clutch part adjacent the first mentioned clutch part, cleaning means in said intake opening driven by said drive member, a stem connected with the first mentioned clutch part and slidable within said shaft for placing said clutch parts in and out of driving relation with each other,  and means connected with the stem for holding the stem in either adjusted position.

16. In a vacuum cleaner, a casing having an intake opening, a motor, a motor shaft, a fan on said shaft, a clutch part on said shaft and slidable longitudinally thereof, said shaft projecting beyond said clutch part, a drive member rotatably mounted on the projecting part of said shaft and having a clutch part adjacent the first mentioned clutch part, cleaning means in said intake opening driven by said drive member, a stem connected with said first mentioned clutch part and slidable within said shaft and longitudinally thereof for placing said clutch parts in and out of driving relation with each other, a cap connected with said stem exterior of said shaft, and means for holding said stem in either adjusted position.

17. In a vacuum cleaner, a casing having a motor therein, a motor shaft, a fan on said shaft, driving means rotatably mounted on said shaft, cleaning elements operatively connected with said driving means, and means extending from one end of and movable in said shaft for disengaging said driving means from operative relation with said shaft, said disengaging means being mounted to rotate with the shaft whenever the shaft rotates.

18. In a vacuum cleaner, a casing, a motor therein, a motor shaft, a fan on said shaft, a gear rotatably mounted on said shaft and disengageable from driving relation therewith, means located on said shaft to produce such disengagement, said disengaging means being mounted to rotate with the shaft whenever the shaft rotates a second gear meshing with the first gear, and cleaning means operatively connected with the second gear, the second gear remaining in engagement with the first gear when the first gear is disengaged from driving relation with said shaft.

19. In a vacuum cleaner, a casing having an intake opening, a motor having a shaft, a fan driven by said shaft, a drive member rotatably mounted on said shaft and having a clutch part, a clutch part on said shaft for driving engagement with the first clutch part, cleaning means within said opening operatively connected with said member, clutch-operating means on said shaft for placing the clutch parts in driving relation, and means also on said shaft cooperating with said clutch-operating means for causing relative movement of the clutch parts for placing the clutch out of driving relation with said member.

In testimony whereof I affix my signature.
CLIFFORD C. DANCE.